United States Patent
Hohmann, Jr.

(10) Patent No.: US 8,978,326 B2
(45) Date of Patent: Mar. 17, 2015

(54) HIGH-STRENGTH PARTITION TOP ANCHOR AND ANCHORING SYSTEM UTILIZING THE SAME

(71) Applicant: Mitek Holdings, Inc., Wilmington, DE (US)

(72) Inventor: Ronald P. Hohmann, Jr., Hauppauge, NY (US)

(73) Assignee: Columbia Insurance Company, Omaha, NE (US)

( * ) Notice: Subject to any disclaimer, the term of this patent is extended or adjusted under 35 U.S.C. 154(b) by 70 days.

(21) Appl. No.: 13/797,102

(22) Filed: Mar. 12, 2013

(65) Prior Publication Data
US 2014/0260065 A1   Sep. 18, 2014

(51) Int. Cl.
| | |
|---|---|
| *E04H 1/00* | (2006.01) |
| *E04H 3/00* | (2006.01) |
| *E04B 1/00* | (2006.01) |
| *E04B 1/38* | (2006.01) |
| *E04C 5/00* | (2006.01) |
| *E04B 1/41* | (2006.01) |

(52) U.S. Cl.
CPC .................................. *E04B 1/4114* (2013.01)
USPC .......... 52/238.1; 52/243.1; 52/250; 52/285.1; 52/710

(58) Field of Classification Search
USPC ............. 52/36.5, 36.6, 39, 238.1, 241, 243.1, 52/250, 281, 284, 285.1, 285.2, 699, 707, 52/710, 704
See application file for complete search history.

(56) References Cited

U.S. PATENT DOCUMENTS

| | | | |
|---|---|---|---|
| 819,869 | A | 5/1906 | Dunlap |
| 903,000 | A | 11/1908 | Priest, Jr. |
| 1,170,419 | A | 2/1916 | Coon et al. |
| RE15,979 | E | 1/1925 | Schaefer et al. |
| 1,794,684 | A | 3/1931 | Handel |
| 1,936,223 | A | 11/1933 | Awbrey |
| 1,988,124 | A * | 1/1935 | Johnson ......................... 52/710 |
| 2,058,148 | A | 10/1936 | Hard |
| 2,097,821 | A | 11/1937 | Mathers |

(Continued)

FOREIGN PATENT DOCUMENTS

| | | |
|---|---|---|
| CH | 279209 | 3/1952 |
| EP | 0199595 B1 | 3/1995 |

(Continued)

OTHER PUBLICATIONS

Hohmann & Barnard, Inc., "Design & Fabrication of Stone Support and Masonry Anchor Systems", 2007 Copyright Information: Creation Date 2005, Registation Date Feb. 6, 2006.*

(Continued)

*Primary Examiner* — Ryan Kwiecinski
(74) *Attorney, Agent, or Firm* — Silber & Fridman

(57) ABSTRACT

A high-strength partition top anchor and anchoring system is disclosed. The high-strength partition top anchor is a dynamic anchor that provides resistance to wall and deck separation during periods of high lateral forces. The partition top anchor is set within a slip tube embedded within the upper most portion of a partition or masonry wall and interconnected with a channel affixed to an overlying slab or deck structure. Foam filler is emplaced within the slip tube and a compressible mat is positioned between the wall and the overlying slab or deck structure to further temper the results of high lateral forces on the building structure.

13 Claims, 5 Drawing Sheets

(56) References Cited

U.S. PATENT DOCUMENTS

| | | | |
|---|---|---|---|
| 2,280,647 A | 4/1942 | Hawes | |
| 2,300,181 A | 10/1942 | Spaight | |
| 2,403,566 A | 7/1946 | Thorp et al. | |
| 2,413,772 A | 1/1947 | Morehouse | |
| 2,605,867 A | 8/1952 | Goodwin | |
| 2,780,936 A * | 2/1957 | Hillberg | 52/710 |
| 2,898,758 A | 8/1959 | Henrickson | |
| 2,909,054 A * | 10/1959 | Phillips | 52/710 |
| 2,929,238 A | 3/1960 | Kaye | |
| 2,966,705 A | 1/1961 | Massey | |
| 2,999,571 A | 9/1961 | Huber | |
| 3,030,670 A | 4/1962 | Bigelow | |
| 3,114,220 A * | 12/1963 | Maddox et al. | 52/506.03 |
| 3,121,978 A * | 2/1964 | Reiland | 52/707 |
| 3,183,628 A | 5/1965 | Smith | |
| 3,254,736 A | 6/1966 | Gass | |
| 3,277,626 A | 10/1966 | Brynjolfsson et al. | |
| 3,300,939 A | 1/1967 | Brynjolfsson et al. | |
| 3,309,828 A | 3/1967 | Tribble | |
| 3,310,926 A | 3/1967 | Brandreth et al. | |
| 3,341,998 A | 9/1967 | Lucas | |
| 3,377,764 A | 4/1968 | Storch | |
| 3,478,480 A | 11/1969 | Swenson | |
| 3,563,131 A | 2/1971 | Ridley, Sr. | |
| 3,568,389 A | 3/1971 | Gulow | |
| 3,640,043 A | 2/1972 | Querfeld et al. | |
| 3,964,226 A | 6/1976 | Hala et al. | |
| 3,964,227 A | 6/1976 | Hala | |
| 4,021,990 A | 5/1977 | Schwalberg | |
| 4,227,359 A | 10/1980 | Schlenker | |
| 4,238,987 A | 12/1980 | Siebrecht-Reuter | |
| 4,305,239 A | 12/1981 | Geraghty | |
| 4,373,314 A | 2/1983 | Allan | |
| 4,382,416 A | 5/1983 | Kellogg-Smith | |
| 4,424,745 A | 1/1984 | Magorian et al. | |
| 4,438,611 A | 3/1984 | Bryant | |
| 4,473,984 A | 10/1984 | Lopez | |
| 4,482,368 A | 11/1984 | Roberts | |
| 4,571,909 A | 2/1986 | Berghuis et al. | |
| 4,596,102 A | 6/1986 | Catani et al. | |
| 4,598,518 A | 7/1986 | Hohmann | |
| 4,606,163 A | 8/1986 | Catani | |
| 4,622,796 A | 11/1986 | Aziz et al. | |
| 4,628,657 A | 12/1986 | Ermer et al. | |
| 4,636,125 A | 1/1987 | Burgard | |
| 4,640,848 A | 2/1987 | Cerdan-Diaz et al. | |
| 4,660,342 A | 4/1987 | Salisbury | |
| 4,703,604 A | 11/1987 | Muller | |
| 4,708,551 A | 11/1987 | Richter et al. | |
| 4,738,070 A | 4/1988 | Abbott et al. | |
| 4,764,069 A | 8/1988 | Reinwall et al. | |
| 4,819,401 A | 4/1989 | Whitney, Jr. | |
| 4,827,684 A | 5/1989 | Allan | |
| 4,843,776 A | 7/1989 | Guignard | |
| 4,852,320 A | 8/1989 | Ballantyne | |
| 4,869,038 A | 9/1989 | Catani | |
| 4,869,043 A | 9/1989 | Hatzinikolas et al. | |
| 4,875,319 A | 10/1989 | Hohmann | |
| 4,911,949 A | 3/1990 | Iwase et al. | |
| 4,922,680 A | 5/1990 | Kramer et al. | |
| 4,946,632 A | 8/1990 | Pollina | |
| 4,955,172 A * | 9/1990 | Pierson | 52/710 |
| 5,063,722 A | 11/1991 | Hohmann | |
| 5,099,628 A | 3/1992 | Noland et al. | |
| 5,207,043 A | 5/1993 | McGee et al. | |
| 5,307,602 A | 5/1994 | Lebraut | |
| 5,392,581 A | 2/1995 | Hatzinikolas et al. | |
| 5,408,798 A | 4/1995 | Hohmann | |
| 5,440,854 A | 8/1995 | Hohmann | |
| 5,454,200 A | 10/1995 | Hohmann | |
| 5,456,052 A | 10/1995 | Anderson et al. | |
| 5,490,366 A | 2/1996 | Burns et al. | |
| 5,598,673 A | 2/1997 | Atkins | |
| 5,634,310 A | 6/1997 | Hohmann | |
| 5,669,592 A | 9/1997 | Kearful | |
| 5,671,578 A | 9/1997 | Hohmann | |
| 5,673,527 A | 10/1997 | Coston et al. | |
| 5,755,070 A | 5/1998 | Hohmann | |
| 5,816,008 A | 10/1998 | Hohmann | |
| 5,819,486 A | 10/1998 | Goodings | |
| 5,845,455 A | 12/1998 | Johnson, III | |
| 6,000,178 A | 12/1999 | Goodings | |
| 6,125,608 A | 10/2000 | Charlson | |
| 6,209,281 B1 | 4/2001 | Rice | |
| 6,279,283 B1 | 8/2001 | Hohmann et al. | |
| 6,284,311 B1 | 9/2001 | Gregorovich et al. | |
| 6,332,300 B1 | 12/2001 | Wakai | |
| 6,351,922 B1 | 3/2002 | Burns et al. | |
| 6,367,219 B1 | 4/2002 | Quinlan | |
| 6,508,447 B1 * | 1/2003 | Catani et al. | 248/300 |
| 6,612,343 B2 | 9/2003 | Camberlin et al. | |
| 6,627,128 B1 | 9/2003 | Boyer | |
| 6,668,505 B1 | 12/2003 | Hohmann et al. | |
| 6,686,301 B2 | 2/2004 | Li et al. | |
| 6,735,915 B1 | 5/2004 | Johnson, III | |
| 6,739,105 B2 | 5/2004 | Fleming | |
| 6,789,365 B1 | 9/2004 | Hohmann et al. | |
| 6,817,147 B1 | 11/2004 | MacDonald | |
| 6,827,969 B1 | 12/2004 | Skoog et al. | |
| 6,837,013 B2 | 1/2005 | Foderberg et al. | |
| 6,851,239 B1 | 2/2005 | Hohmann et al. | |
| 6,925,768 B2 | 8/2005 | Hohmann et al. | |
| 6,941,717 B2 | 9/2005 | Hohmann et al. | |
| 6,968,659 B2 | 11/2005 | Boyer | |
| 7,007,433 B2 | 3/2006 | Boyer | |
| 7,017,318 B1 | 3/2006 | Hohmann et al. | |
| 7,043,884 B2 | 5/2006 | Moreno | |
| 7,059,577 B1 | 6/2006 | Burgett | |
| D527,834 S | 9/2006 | Thimons et al. | |
| 7,147,419 B2 | 12/2006 | Balbo Di Vinadio | |
| 7,152,382 B2 | 12/2006 | Johnson, III | |
| 7,171,788 B2 | 2/2007 | Bronner | |
| 7,178,299 B2 | 2/2007 | Hyde et al. | |
| D538,948 S | 3/2007 | Thimons et al. | |
| 7,225,590 B1 | 6/2007 | diGirolamo et al. | |
| 7,325,366 B1 | 2/2008 | Hohmann, Jr. et al. | |
| 7,334,374 B2 | 2/2008 | Schmid | |
| 7,374,825 B2 | 5/2008 | Hazel et al. | |
| 7,415,803 B2 | 8/2008 | Bronner | |
| 7,469,511 B2 | 12/2008 | Wobber | |
| 7,481,032 B2 | 1/2009 | Tarr | |
| 7,552,566 B2 | 6/2009 | Hyde et al. | |
| 7,562,506 B2 | 7/2009 | Hohmann, Jr. | |
| 7,587,874 B2 | 9/2009 | Hohmann, Jr. | |
| 7,654,057 B2 * | 2/2010 | Zambelli et al. | 52/710 |
| 7,735,292 B2 | 6/2010 | Massie | |
| 7,748,181 B1 | 7/2010 | Guinn | |
| 7,788,869 B2 | 9/2010 | Voegele, Jr. | |
| D626,817 S | 11/2010 | Donowho et al. | |
| 7,845,137 B2 | 12/2010 | Hohmann, Jr. | |
| 8,037,653 B2 | 10/2011 | Hohmann, Jr. | |
| 8,051,619 B2 | 11/2011 | Hohmann, Jr. | |
| 8,096,090 B1 | 1/2012 | Hohmann, Jr. et al. | |
| 8,109,706 B2 | 2/2012 | Richards | |
| 8,122,663 B1 | 2/2012 | Hohmann, Jr. et al. | |
| 8,154,859 B2 * | 4/2012 | Shahrokhi | 361/679.01 |
| 8,201,374 B2 | 6/2012 | Hohmann, Jr. | |
| 8,209,934 B2 | 7/2012 | Pettingale | |
| 8,215,083 B2 | 7/2012 | Toas et al. | |
| 8,291,672 B2 | 10/2012 | Hohmann, Jr. et al. | |
| 8,347,581 B2 | 1/2013 | Doerr et al. | |
| 8,375,667 B2 | 2/2013 | Hohmann, Jr. | |
| 8,418,422 B2 | 4/2013 | Johnson, III | |
| 8,511,041 B2 | 8/2013 | Fransen | |
| 8,516,763 B2 | 8/2013 | Hohmann, Jr. | |
| 8,516,768 B2 | 8/2013 | Johnson, III | |
| 8,544,228 B2 | 10/2013 | Bronner | |
| 8,555,587 B2 | 10/2013 | Hohmann, Jr. | |
| 8,555,596 B2 | 10/2013 | Hohmann, Jr. | |
| 8,596,010 B2 | 12/2013 | Hohmann, Jr. | |
| 8,613,175 B2 | 12/2013 | Hohmann, Jr. | |
| 8,635,832 B2 * | 1/2014 | Heudorfer et al. | 52/704 |
| 8,667,757 B1 | 3/2014 | Hohmann, Jr. | |
| 2001/0054270 A1 | 12/2001 | Rice | |

(56) References Cited

U.S. PATENT DOCUMENTS

| | | |
|---|---|---|
| 2002/0100239 A1 | 8/2002 | Lopez |
| 2003/0121226 A1 | 7/2003 | Bolduc |
| 2003/0217521 A1* | 11/2003 | Richardson et al. ........... 52/92.2 |
| 2004/0083667 A1 | 5/2004 | Johnson, III |
| 2004/0216408 A1 | 11/2004 | Hohmann, Jr. |
| 2004/0216413 A1 | 11/2004 | Hohmann et al. |
| 2004/0216416 A1 | 11/2004 | Hohmann et al. |
| 2004/0231270 A1 | 11/2004 | Collins et al. |
| 2005/0279043 A1 | 12/2005 | Bronner |
| 2006/0198717 A1 | 9/2006 | Fuest |
| 2006/0242921 A1 | 11/2006 | Massie |
| 2006/0251916 A1 | 11/2006 | Arikawa et al. |
| 2008/0092472 A1 | 4/2008 | Doerr et al. |
| 2008/0141605 A1 | 6/2008 | Hohmann |
| 2008/0222992 A1 | 9/2008 | Hikai et al. |
| 2009/0133351 A1 | 5/2009 | Wobber |
| 2009/0133357 A1 | 5/2009 | Richards |
| 2010/0037552 A1 | 2/2010 | Bronner |
| 2010/0071307 A1 | 3/2010 | Hohmann, Jr. |
| 2010/0101175 A1 | 4/2010 | Hohmann |
| 2010/0192495 A1 | 8/2010 | Huff et al. |
| 2010/0257803 A1 | 10/2010 | Hohmann, Jr. |
| 2011/0023748 A1 | 2/2011 | Wagh et al. |
| 2011/0041442 A1 | 2/2011 | Bui |
| 2011/0047919 A1 | 3/2011 | Hohmann, Jr. |
| 2011/0061333 A1 | 3/2011 | Bronner |
| 2011/0083389 A1 | 4/2011 | Bui |
| 2011/0146195 A1 | 6/2011 | Hohmann, Jr. |
| 2011/0173902 A1 | 7/2011 | Hohmann, Jr. et al. |
| 2011/0277397 A1 | 11/2011 | Hohmann, Jr. |
| 2012/0186183 A1 | 7/2012 | Johnson, III |
| 2012/0304576 A1 | 12/2012 | Hohmann, Jr. |
| 2012/0308330 A1 | 12/2012 | Hohmann, Jr. |
| 2013/0008121 A1 | 1/2013 | Dalen |
| 2013/0074435 A1 | 3/2013 | Hohmann, Jr. |
| 2013/0232893 A1 | 9/2013 | Hohmann, Jr. |
| 2013/0232909 A1 | 9/2013 | Curtis et al. |
| 2013/0247482 A1 | 9/2013 | Hohmann, Jr. |
| 2013/0247483 A1 | 9/2013 | Hohmann, Jr. |
| 2013/0247484 A1 | 9/2013 | Hohmann, Jr. |
| 2013/0247498 A1 | 9/2013 | Hohmann, Jr. |
| 2013/0340378 A1 | 12/2013 | Hohmann, Jr. |
| 2014/0000211 A1 | 1/2014 | Hohmann, Jr. |
| 2014/0075855 A1 | 3/2014 | Hohmann, Jr. |
| 2014/0075856 A1 | 3/2014 | Hohmann, Jr. |
| 2014/0075879 A1 | 3/2014 | Hohmann, Jr. |
| 2014/0096466 A1 | 4/2014 | Hohmann, Jr. |
| 2014/0174013 A1 | 6/2014 | Hohmann, Jr. et al. |

FOREIGN PATENT DOCUMENTS

| | | |
|---|---|---|
| GB | 1575501 | 9/1980 |
| GB | 2069024 A | 8/1981 |
| GB | 2246149 A | 1/1992 |
| GB | 2265164 A | 9/1993 |
| GB | 2459936 A | 3/2013 |

OTHER PUBLICATIONS

ASTM Standard E754-80 (2006), Standard Test Method for Pullout Resistance of Ties and Anchors Embedded in Masonry Mortar Joints, ASTM International, 8 pages, West Conshohocken, Pennsylvania, United States.

Building Envelope Requirements for Commercial and High Rise Residential Buildings, 780 CMR sec. 1304.0 et seq. of Chapter 13, Jan. 1, 2001, 19 pages, Boston, Massachusetts, United States.

Hohmann & Barnard, Inc.; Product Catalog, 2009, 52 pages, Hauppauge, New York, United States.

ASTM Standard Specification A951/A951M-11, Table 1, Standard Specification for Steel Wire for Masonry Joint Reinforcement, Nov. 14, 2011, 6 pages, West Conshohocken, Pennsylvania, United States.

Building Code Requirements and Specification for Masonry Structures, TMS 402-11/ACI 530-11/ASCE 5-11, 2011, Sections 1.7.1, 1.7.3, 1.7.4, 2 pages (pp. C-13 and CC-8).

Building Code Requirements for Masonry Structures, ACI 530-05/ASCE 5-05/TMS 402-05, 2005, Chapter 6, 4 pages.

State Board of Building Regulations and Standards, Building Envelope Requirements, 780 CMR sec. 1304.0 et seq., 7th Edition, Aug. 22, 2008, 11 pages, Boston, MA, United States.

Hohmann & Barnard, Product Catalog, 44 pgs (2003).

Kossecka, Ph.D, et al., Effect of Insulation and Mass Distribution in Exterior Walls on Dynamic Thermal Performance of Whole Buildings, Thermal Envelopes VII/Building Systems—Principles p. 721-731, 1998, 11 pages.

* cited by examiner

HIGH-STRENGTH PARTITION TOP ANCHOR AND ANCHORING SYSTEM UTILIZING THE SAME

BACKGROUND OF THE INVENTION

1. Field of the Invention

This invention relates to an improved anchoring arrangement for use in conjunction with building construction having an overlying concrete slab, concrete deck, or steel frame structure secured to the upper limits of a partition or masonry wall. More particularly, the invention relates to construction accessory devices, namely, high-strength partition top anchors set within a slip tube embedded in the uppermost portion of the wall and interconnected with the overlying structure. The invention is applicable to structures subjected to high lateral forces.

2. Description of the Prior Art

In the past, investigations relating to the effects of various forces, particularly high lateral loads or forces, upon structures located in areas subject to hurricanes, tornados, earthquakes and related destructive natural occurrences, demonstrated the advantages of having high-strength anchoring components interconnecting the vertical wall with the overlying slab or deck structure. The present invention improves on the prior art partition anchoring systems.

Anchoring systems for wall construction come in varied forms depending on the wall materials and structural use. Ronald P. Hohmann and Hohmann & Barnard, Inc., now a MiTek-Berkshire Hathaway company, have successfully commercialized numerous devices to secure wall structures to overlying structures, providing widespread improvements that include increases in interconnection strength, ease of manufacture and use, and thermal isolation. The present invention is an improvement in interconnection strength and lateral force reduction between the vertical wall and the overlying horizontal structure.

Earthquakes, strong storms, hurricanes, typhoons, tornadoes and the lateral forces that they create are devastating to building structures. In the United States, like many other countries, wind damage to building structures amounts to millions of dollars each year in losses. Many houses and other small buildings in the Caribbean hurricane zone can lose their ROOFS to category 3 and 4 storms under current construction methods. Structural weaknesses occur at the tie-down of the overlying structure to the walls. Current construction methods often fail to withstand hurricane uplift forces without separation of the overlying structure from the walls. A properly designed and anchored building can resist such damage through the use of the present partition top anchor. A properly constructed building structure must be designed to resist both vertical loads (loads acting in an up and down direction) and lateral loads (loads acting in a direction parallel to the ground).

The primary focus of this invention is to protect against high lateral load forces. The two major lateral load forces result from high winds, such as those from a hurricane, and seismic forces, such as those resulting from an earthquake. Wind and seismic forces can occur from any direction and the structure must be designed to withstand such forces. Each major building component and connection between each component must be constructed so each has the capacity to resist all the loads and transfer such loads between them and into the foundation. This transfer of loads is known as the load path.

Lateral loads are either transferred into the overlying structure, when wind pushes against the walls perpendicular to the wind, or they originate directly in the overlying structure during seismic activity. To withstand such lateral loads, the structure must be engineered to provide an acceptable level of structural integrity so that life-safety is assured and structural damage is minimized. Much of the structural damage caused by high lateral loads occurs at a weak link in the structure—the juncture of the horizontal overlying structure with the vertical support structures. The present invention is focused upon this juncture.

Static connections such as those presented in Argay, et al., U.S. Pat. No. 6,058,669 and Ramirez, U.S. Pat. No. 5,782,048, between the horizontal and vertical component of a structure often result in the separation of the components during prolonged periods of high lateral loads. As a result, dynamic partition top anchors, where the anchor is set in a slip tube embedded within the vertical wall are utilized for construction of structures that will be subjected to high lateral loads. The dynamic partition top anchor is interconnected along a slot or channel in the overlying structure and permitted to adjust in vertical and horizontal directions during times of high lateral load forces, allowing deflection of the overlying structure above the wall without transferring compressive loads.

Prior art partition top anchors are designed as a combination of a steel rod and attachment welded dovetail head. Such design locates the welded connection portion outside the connecting channel, thereby subjecting the weld between the rod and dovetail head to high levels of lateral load forces. The high level load forces at the weld point result in structural failure and separation of the rod and dovetail head removing the anchored connection. The present invention improves the prior art design by reengineering the dovetail head as an integral component of the rod structure, bonding the dovetail head within the rod, thereby providing a high-strength welded connection. Further, the welded interconnection is fully set within the channel, thereby redirecting the lateral forces to the high-strength steel rod and away from the welded connection. The present invention provides greater protection against anchor separation and structural strength than the prior art designs.

None of the above prior art anchors or anchoring systems provide a high-strength partition top anchor that can resist large scale lateral forces. This invention relates to an improved anchoring arrangement for use in conjunction with building construction having a wall secured at its upper limit to an overlying structure and meets the heretofore unmet need described above.

SUMMARY

In general terms, in one embodiment the invention is a partition top anchor and anchoring system for use in anchoring a partition or masonry wall to an overlying deck or slab. The system includes an anchor substantially disposed within a slip tube that is embedded within the uppermost portion of the wall. The anchor includes a key member that is interconnected with a keyway channel affixed to the overlying deck or slab. The anchor and slip tube are dimensioned to allow for vertical movement of the anchor during periods of high lateral forces.

In another aspect, the partition top anchor is constructed from steel or similar high-strength material. The anchor includes a rod member disposed within the slip tube and a key member interconnected within the throat of the keyway channel. The key member is integrally formed with the rod member and fully disposed within the keyway channel upon installation. The key member and the keyway channel are dovetail structures.

The slip tube houses a compressible mat set opposite the slip tube open end, which faces the throat opening in the keyway channel. Additionally, a compressible foam member is disposed between the wall and the overlying slab or deck to provide a cushion between the overlying slab and wall.

It is an object of the present invention to provide, in an anchoring system having a masonry or partition wall anchored at its highest point to an overlying structure, a high-strength partition top anchor, which includes a slip tube and channel attachment.

It is another object of the present invention to provide a specialized partition top anchor that is configured to provide a high-strength dynamic interlock between the wall and the overlying structure.

It is another object of the present invention to provide labor-saving devices to simplify installations of walls and the securement thereof to overlying structures.

It is a further object of the present invention to provide an anchoring system for a structure subjected to high lateral forces that is economical to manufacture, resulting in a relatively low unit cost.

It is a feature of the present invention that when the partition top anchor is installed within the slip tube and the channel, the partition top anchor provides vertical adjustment in response to high lateral forces.

It is a further feature of the present invention that when the partition top anchor is installed within the slip tube and the channel, the anchor resists movement along the z-axis while allowing limited movement along the x-axis.

It is another feature of the present invention that the partition top anchors are utilizable with a partition or masonry wall interconnected with a concrete or steel overlying structure.

It is yet another feature of the present invention that the partition top anchor provides a high-strength interconnection with the overlying structure.

Other objects and features of the invention will become apparent upon review of the drawings and the detailed description.

BRIEF DESCRIPTION OF THE DRAWINGS

In the following drawings, the same parts in the various views are afforded the same reference designators.

DESCRIPTION OF THE PREFERRED EMBODIMENTS

In the embodiment described herein, the high-strength partition top anchor and anchoring system is designed in accordance with the Building Code Requirements for Masonry Structures, ACI 530-05/ASCE 5-05/TMS 402-05. In order to comply with the requirements, masonry structures must be designed to resist applicable loads and provide a continuous load path(s) to properly transfer forces.

Figure 1:
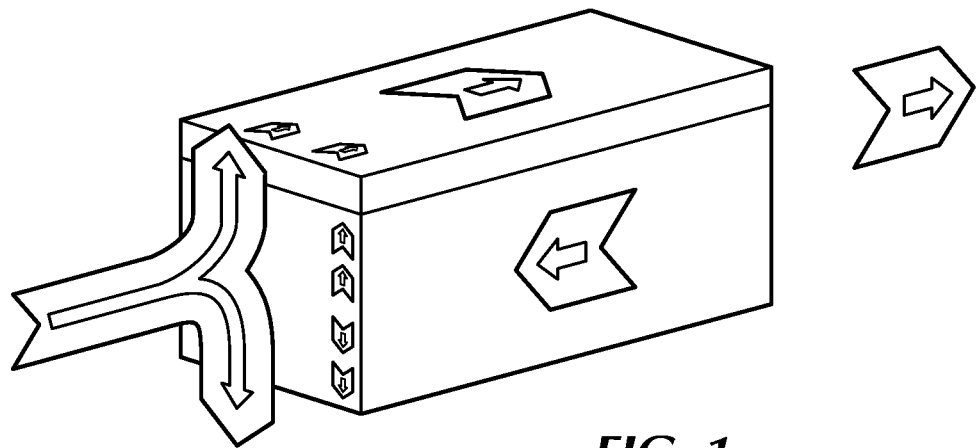
FIG. 1 is a perspective view of a building structure anchored to an overlying slab, the building structure being subjected to high wind lateral forces and showing the effects of the forces on the building structure.
Figure 2:
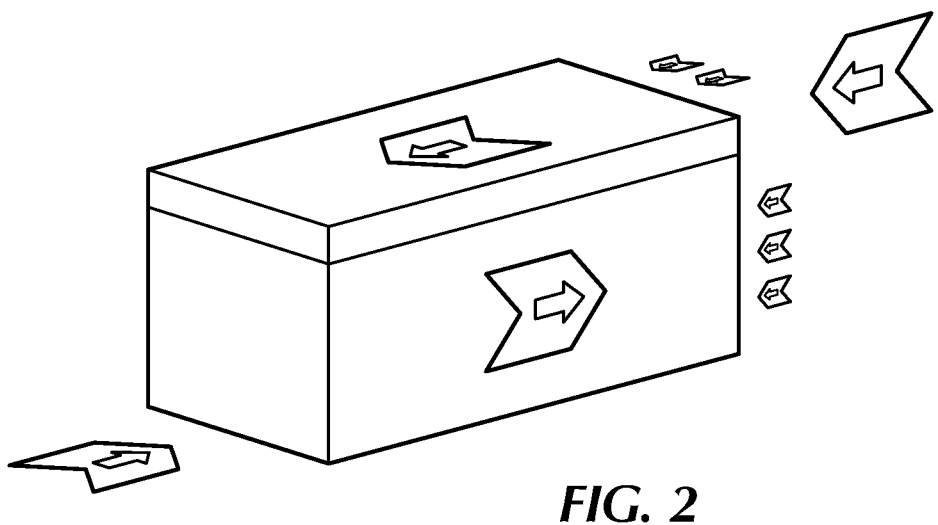
FIG. 2 is a perspective view of a building structure anchored to an overlying slab, the building structure being subjected to high seismic activity and showing the effects of the forces on the building structure.

Buildings require a structural system that is designed to resist high wind and earthquake loads. In particular application to the partition top anchors presented herein, walls must be designed to resist loads, moments and shears applied at intersections with horizontal members. The effects of lateral deflection and translation of members providing lateral support must be considered and devices used to transfer lateral support from members that intersect walls must be designed to resist the forces involved. The disclosed partition top anchors are designed to provide lateral shear resistance at the upper limit of partition or masonry walls. These anchors permit vertical deflection of the overlying slab, without transferring compressive loads to the wall below. The partition top anchors are suitable for construction having steel or concrete roofs and resist dynamic forces capable of blowing, lifting or collapsing such roof. Such forces and their effect on building structures are shown in FIG. 1 (high-winds) and FIG. 2 (seismic).

Figure 3:
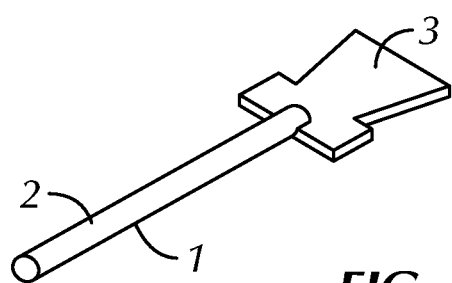
FIG. 3 is a perspective view of the prior art partition top anchor having the rod and dovetail head welded together.
Figure 3A:
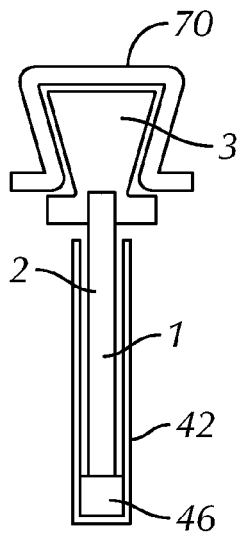
FIG. 3a is a side view of the prior art partition top anchor set within the channel, the welded interconnection between the rod and the dovetail head lie outside the channel, the anchor is set within a slip tube with a foam stopper set therein.
Figure 4:
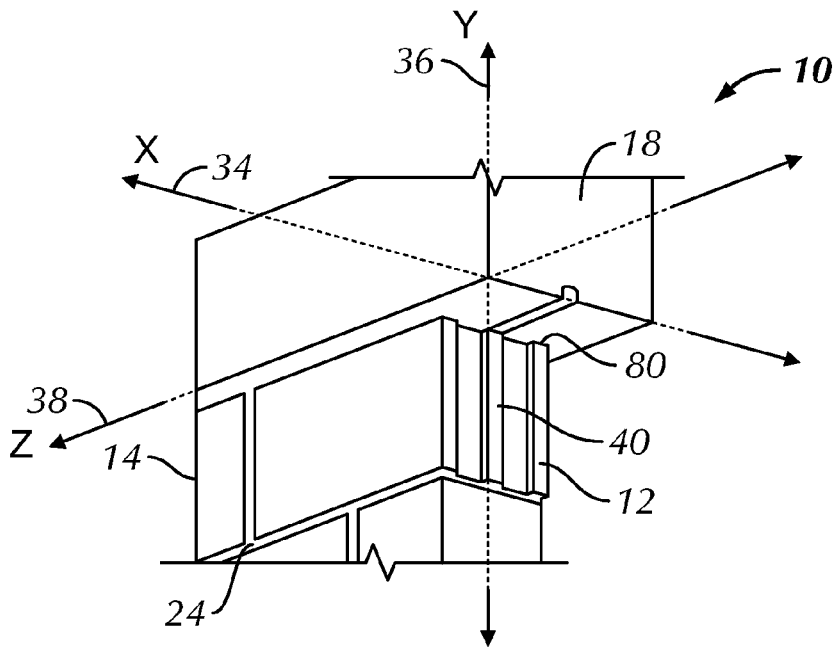
FIG. 4 is a perspective view of the disclosed partition top anchor and anchoring system having a partition top anchor inserted within a slip tube set within a masonry wall and secured within a channel secured to an overlying concrete slab.
Figure 5:
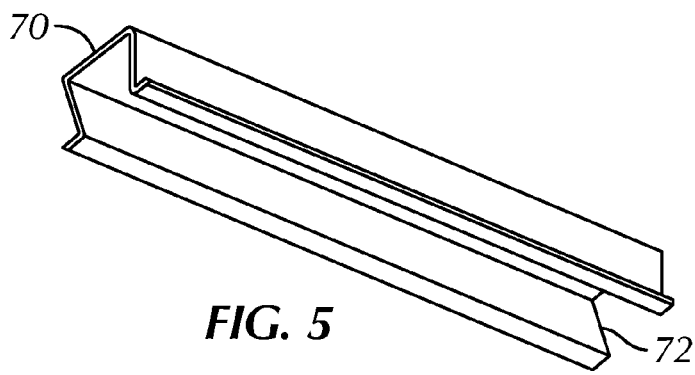
FIG. 5 is a perspective view of the channel of FIG. 4.
Figure 6:
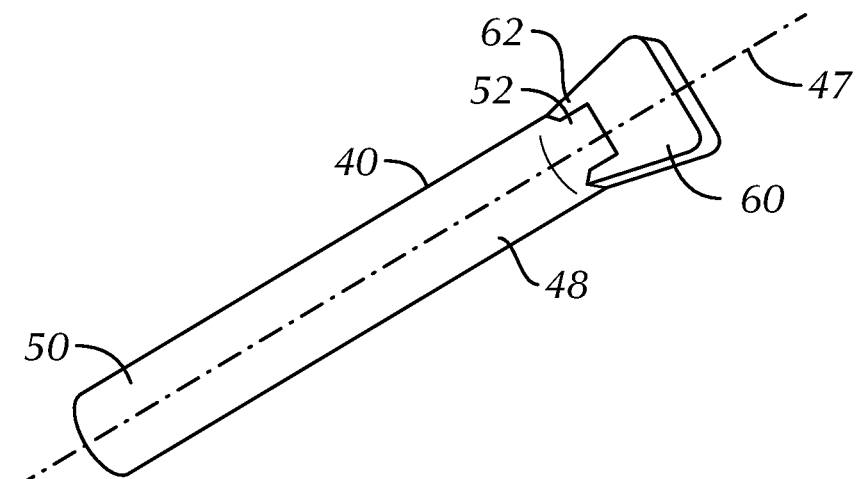
FIG. 6 is a perspective view of the partition top anchor of FIG. 4.
Figure 7:
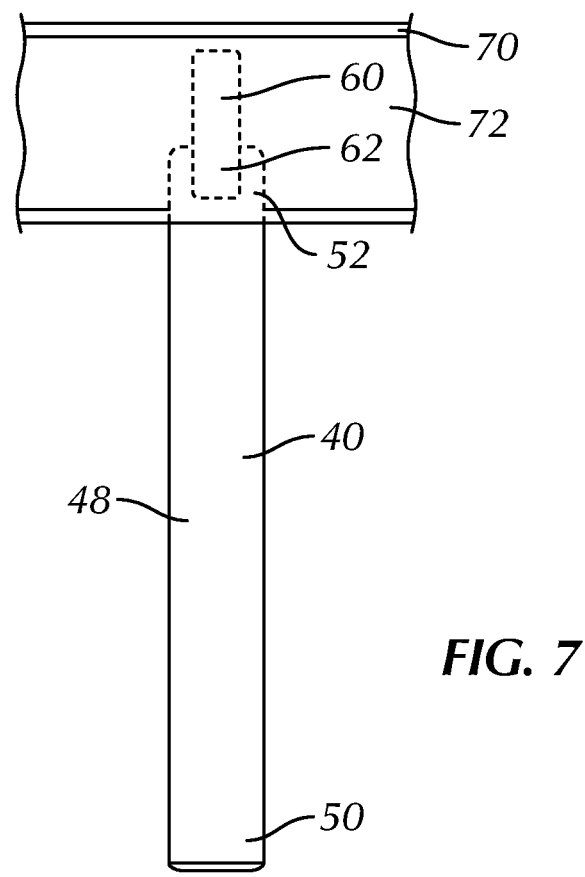
FIG. 7 is a side view of the partition top anchor and anchoring system of FIG. 4 with the anchor set within the channel.
Figure 8:
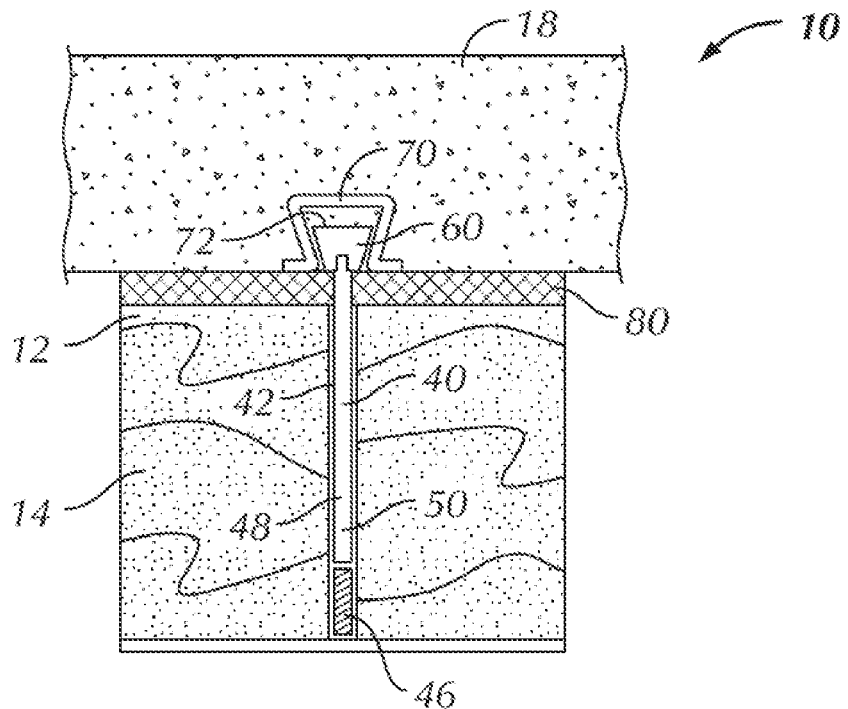
FIG. 8 is a cross-sectional view of the partition top anchor and anchoring system of FIG. 4 having a partition top anchor set within a slip tube and the channel, the slip tube having a foam stopper and the channel embedded within the overlying concrete slab, a foam structure is emplaced between the wall and the overlying slab.
Figure 9:
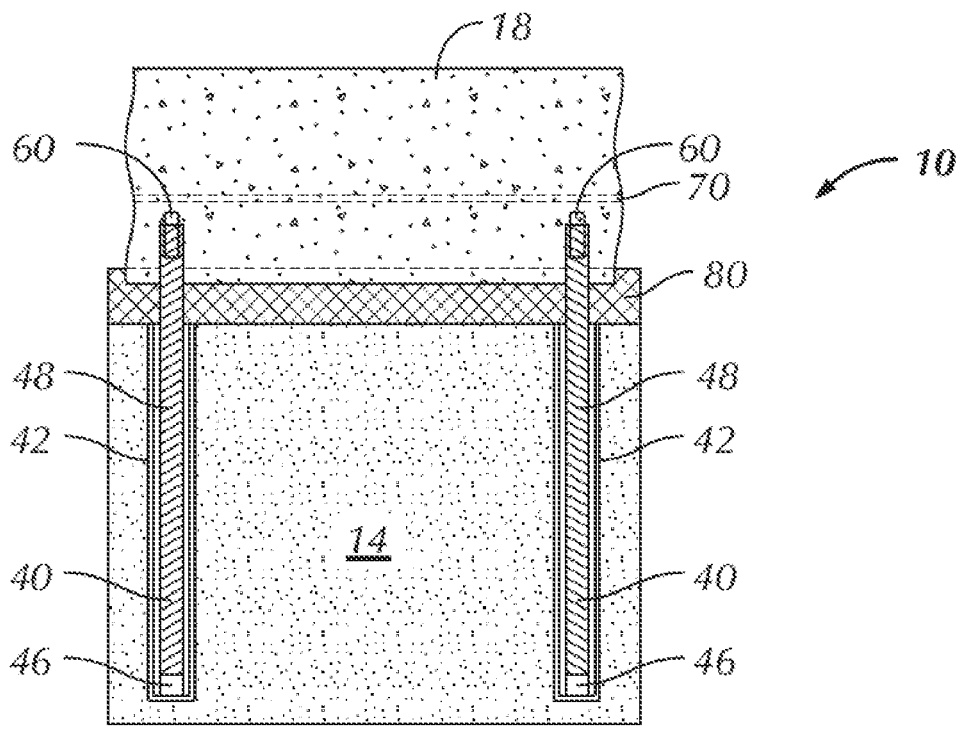
FIG. 9 is a cross-sectional view of the partition top anchor and anchoring system of FIG. 4 having two partition top anchors set within slip tubes and the channel, each slip tube having a foam stopper placed therein and the channel affixed to a overlying steel structure, a foam structure is emplaced between the wall and the overlying slab.
Figure 10:
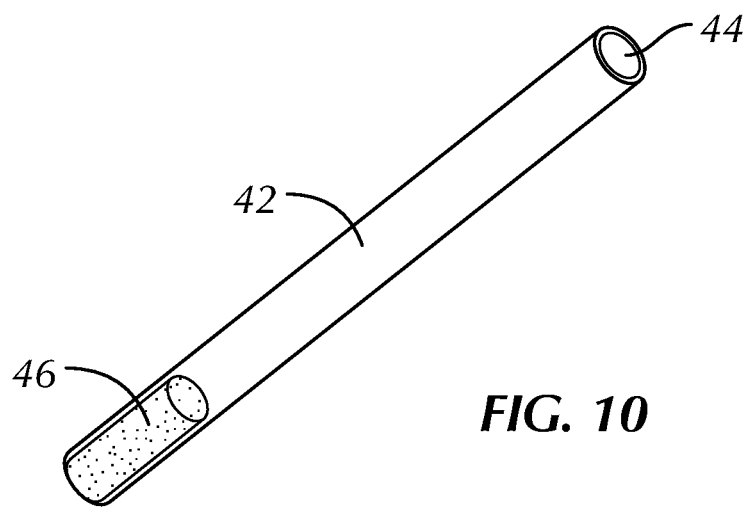
FIG. 10 is a perspective view of the slip tube of FIG. 4 with the foam stopper placed therein; and, FIG. 11 is a cross-sectional view of the slip tube and foam stopper with the partition top anchor set therein.
Figure 11:
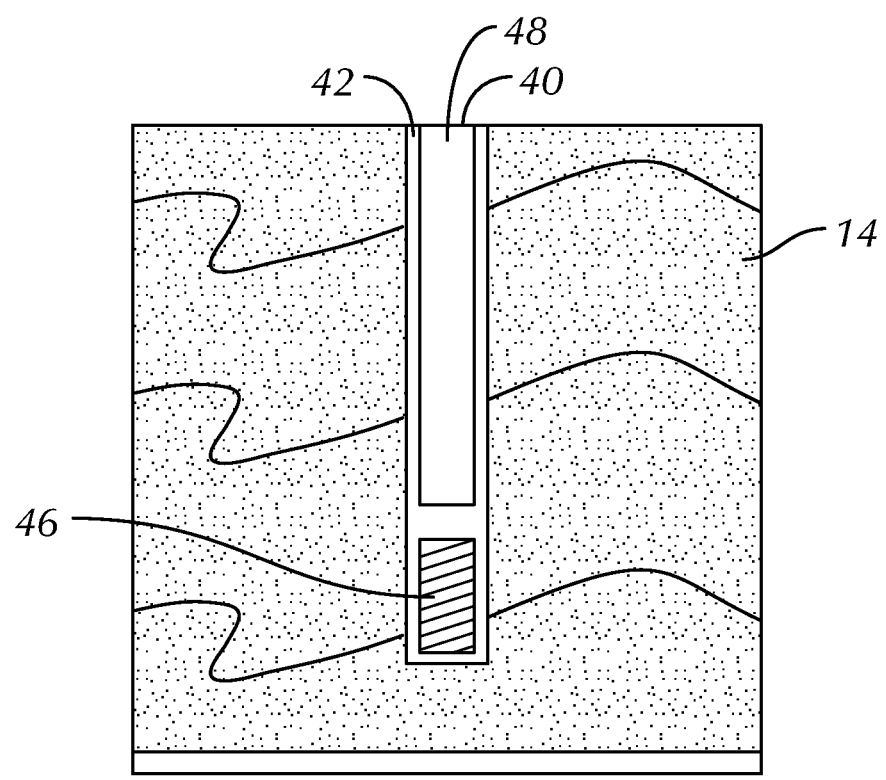

The prior art anchors and anchoring systems are shown in FIGS. 3 and 3a. The anchor 1 is comprised of two components, a metal rod 2 and a metal dovetail head 3. The dovetail head 3 is welded to the metal rod 2. When installed, the anchor 1 is set within a slip tube 42, having a foam stopper or filler 46 set therein. The slip tube 42 is embedded in a vertical wall structure (not shown) and interconnected with a metal keyway channel 70. The channel 70 is embedded or affixed to an overlying slab or structure (not shown). When set within the slip tube 42 and connected to the channel 70, the anchor rod 2 and portion of the dovetail head 3 welded to the rod 2 sit outside the channel 70. When emplaced within the structure and subjected to high-strength lateral forces, the lateral forces set on the weak interconnection point between the dovetail head 3 and the rod 2, resulting in the failure and separation of the dovetail head 3 and the rod 2. Such separation causes the overlying slab to dislodge from the wall, causing structural damage and resulting safety concerns. The present invention improves on the prior art anchor by modifying the anchor design and refocusing the forces on the high-strength rod and away from the interconnection point.

Referring now to FIGS. 4 through 11, the partition top anchor and anchoring system of this invention is shown and is referred to generally by the number 10. A wall structure 12 is shown having a partition or masonry wall 14 and an overlying deck or slab 18 of concrete or steel components.

For purposes of discussion, the exterior surface 24 of the wall structure 12 contains a horizontal line or x-axis 34 and an intersecting vertical line or y-axis 36. A horizontal line or z-axis 38, normal to the xy-plane, also passes through the coordinate origin formed by the intersecting x- 34 and y-axes 36. In the discussion which follows, it will be seen that the partition top anchors 40 are constructed to restrict movement interfacially along the z-axis 38 and allow for limited movement along the x-axis 34 and the y-axis 36. The device 10 includes a partition top anchor 40 constructed for insertion within a slip tube 42 embedded in the wall 14 and interconnection with a keyway channel 70 affixed to the deck 18.

The slip tube 42 is embedded in the top of the wall 14 and the vertical joint is then filled with mortar, fully surrounding the exterior of the slip tube 42. The slip tube 42 is a polymeric or other structure capable of maintaining its structure when embedded within the wall 14 and has an open end 44 disposed at the upper most portion of the wall 14. The slip tube has a predetermined diameter. A compressible mat or expansion filler 46 is set within the slip tube 42 at the bottom of the slip tube 42 away from the open end 44. The filler 46 restricts mortar entry into the slip tube 42 and allows for anchor 40 deflection. The anchor 40 is partially disposed within the slip tube 42.

The anchor 40 is constructed from a high-strength material such as galvanized steel, hot dip galvanized steel, stainless steel, or bright basic steel. The anchor 40 includes a rod member 48 that is substantially disposed within the slip tube 42. The rod member 48 has a predetermined diameter. The rod member diameter is in a close fitting functional relationship with the slip tube 42 diameter, allowing the rod member 48 to be vertically adjusted within the slip tube 42 when subjected to lateral forces. The close fitting relationship between the diameter of the rod member 48 and the slip tube 42 diameter restricts anchor 40 movement within the slip tube 42 along the x- 34 and z-axes 38.

The rod member 48 includes an insertion portion 50, set within the slip tube 42 adjacent to the filler 46, and an interconnecting portion 52. A key member 60, having a substantially dovetail shape, is integrally formed with the rod member 48 and has a common longitudinal axis 47 therewith. The key member 60 is partially formed from the rod interconnecting portion 52. The key member 60 insertion member 62 is welded within the interconnecting portion 52, forming a high-strength bond between the rod member 48 and the key member 60.

The key member 60 is configured to be disposed entirely within the keyway channel 70 which is embedded within the overlying deck 18. The keyway channel 70 has a throat opening 72 at the deck 18 exterior face plane. The open end 44 of the slip tube 42 is disposed opposite the throat opening 72. The key member 60 interlocks with the keyway channel 70 and the key member 60 is disposed within the throat opening 72 of the keyway channel 70. The key member 60 is a dovetail fitting having a substantially similar dimension to the keyway channel 70. When the key member 60 is inserted within the keyway channel 70, key member 60 movement is restricted along the y- 36 and z-axis 38 and limited along the x-axis 34.

The anchoring system further includes a compressible foam member 80 set between the deck 18 and the wall 14. The foam member 80 serves to separate the deck 18 and the wall 14 and temper the compressive forces acting on the structure 12.

The presently presented partition top anchor 40 serves to dynamically interconnect the wall 14 and the deck 18. The dynamic nature of the anchor 40 and its ability to vertically adjust during occurrences of high-lateral forces serves to contain the forces and provide a proper load path to restrict structural damage. The use of the dynamic partition top anchor 40 resists tensile forces tending to lift or separate walls and overlying structures, while protecting the top of a partition or masonry wall 14 from damage inflicted by lateral forces thereupon and maintaining the relationship between an overlying deck or slab 18 and the adjoining wall 14.

The present invention improves on the prior art partition top anchors 1 through its novel design that ensures that the key member 60 is completely located within the keyway channel 70. This design ensures that the high lateral forces are focused on the high-strength steel rod member 48 and not the prior art weld point between the rod 2 and the dovetail member 3. The present invention improves the prior art design by reengineering the key member 60 as an integral component of the rod member 48—bonding the key member 60 within the rod member 48—thereby providing a high-strength welded connection. The present invention provides greater protection against anchor separation during periods of high lateral loads and greater structural strength than the prior art designs.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A high-strength anchoring system for protecting the top of a partition or masonry wall from damage inflicted by lateral forces thereupon and maintaining the relationship between an overlying deck or slab and the adjoining masonry wall, the anchoring system comprising:
a keyway channel embedded in the deck, the keyway channel having a throat opening at the deck exterior face plane;
a slip tube embedded in the top of the wall having an open end disposed opposite the throat opening of the keyway channel, the slip tube having a predetermined diameter;
a rod member disposed within the slip tube, the rod member having a predetermined diameter, the rod member further comprising an insertion portion and an interconnecting portion set opposite the one to the other; and,
a key member integrally formed with the rod member having a common longitudinal axis therewith, the key member interlocking with the keyway channel and having the key member disposed entirely within the throat opening of the keyway channel, wherein the key member is welded to the rod member, forming a high-strength welded connection, the high-strength welded connection being disposed entirely within the keyway channel;
whereby the lateral forces are exerted against the rod member which provides a high level of protection thereto.

2. The anchoring system of claim 1 wherein the anchoring system further comprises a compressible mat set within the slip tube adjacent the rod member insertion portion.

3. The anchoring system of claim 2 wherein the rod member diameter is in a close fitting functional relationship with the slip tube diameter allowing the rod member to be vertically adjusted within the slip tube when subjected to lateral forces.

4. The anchoring system of claim 3 wherein the key member is partially formed from the rod member interconnecting portion.

5. The anchoring system of claim 4 wherein the key member further comprises a dovetail fitting welded within the rod member interconnecting portion thereby forming a high-strength bond between the rod member and the key member.

6. The anchoring system of claim 5 wherein the keyway channel is a dovetail fitting configured to receive the key member, whereby upon interconnection of the key member with the keyway channel, key member movement is restricted.

7. The anchoring system of claim 1 wherein the anchoring system further comprises a compressible foam member set between the deck and the wall.

8. A high-strength anchoring system for protecting the top of a partition or masonry wall from damage inflicted by lateral forces thereupon and maintaining the relationship between an overlying deck or slab and the adjoining masonry wall, the anchoring system comprising:
 a keyway channel embedded in the deck, the keyway channel having a throat opening at the deck exterior face plane;
 a slip tube embedded in the top of the wall having an open end disposed opposite the throat opening of the keyway channel, the slip tube having a predetermined diameter;
 a rod member disposed within the slip tube, the rod member having a predetermined diameter, the rod member further comprising an insertion portion and an interconnecting portion set opposite the one to the other; and,
 a dovetail key member welded within the rod member interconnecting portion forming a high-strength welded connection, the dovetail key member and having a common longitudinal axis with the rod member interconnecting portion, the key member interlocking with the keyway channel throat opening, wherein the high-strength welded connection is positioned entirely within the keyway channel;
 whereby the lateral forces are exerted against the rod member which provides a high level of protection thereto.

9. The anchoring system of claim 8 wherein the anchoring system further comprises a compressible mat set within the slip tube adjacent the rod member insertion portion.

10. The anchoring system of claim 8 wherein the anchoring system further comprises a compressible foam member set between the deck and the wall.

11. The anchoring system of claim 8 wherein the rod member diameter is in a close fitting functional relationship with the slip tube diameter allowing the rod member to be vertically adjusted within the slip tube when subjected to lateral forces.

12. The anchoring system of claim 11 wherein the keyway channel is a dovetail fitting configured to receive the key member, whereby upon interconnection of the key member within the keyway channel, key member movement is restricted.

13. The anchoring system of claim 12 wherein the rod member and the key member are constructed of material selected from a group consisting of galvanized steel, hot dip galvanized steel, stainless steel, and bright basic steel.

* * * * *